(12) United States Patent
Paolini et al.

(10) Patent No.: US 6,603,476 B1
(45) Date of Patent: Aug. 5, 2003

(54) METHOD, SYSTEM AND PROGRAM FOR TOPOGRAPHICALLY AWARE OPERATING SYSTEM

(75) Inventors: Michael Paolini, Round Rock, TX (US); Lorin Evan Ullmann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/466,499

(22) Filed: Dec. 17, 1999

(51) Int. Cl.[7] .............................................. G06T 15/20
(52) U.S. Cl. ....................... 345/427; 345/581; 345/589; 345/619; 345/620; 345/664; 345/665
(58) Field of Search ................................ 345/419, 427, 345/426, 581, 661, 505, 428, 619, 589, 620, 664, 665; 714/25; 340/995

(56) References Cited

U.S. PATENT DOCUMENTS

| | | | | |
|---|---|---|---|---|
| 5,394,524 A | * | 2/1995 | DiNicola et al. | 345/505 |
| 5,781,195 A | * | 7/1998 | Marvin | 345/428 |
| 6,169,516 B1 | * | 1/2001 | Watanabe et al. | 340/995 |
| 6,357,019 B1 | * | 3/2002 | Blaisdell et al. | 714/25 |

* cited by examiner

Primary Examiner—Mark Zimmerman
Assistant Examiner—Kimbinh T. Nguyen
(74) Attorney, Agent, or Firm—Marilyn Smith Dawkins; Bracewell & Patterson, L.L.P.

(57) ABSTRACT

A topographical aware Operating System (OS) which is platform and application independent. The OS contains a 2D to 3D rendering converter within a topographical framework, a Java Virtual Machine (JVM) interface and topographical application programming interface (APIs). The OS operates within a 2D environment and is capable of receiving input from a topographical input device and generates topographical output to a topographical or 2D output device. The OS further contains means for converting topographical input signals into topographical output, independent of which platform or applications which are running on the data processing system. In the preferred embodiment, the OS operates within a JVM environment and the topographical attributes enabled within the JVM environment include height, temperature, roughness, intensity, color, illumination, springiness etc. In another preferred embodiment, a topographical selection GUI is provided by which the OS may dynamically select attributes, etc. or allow user selection of particular attributes to apply to an object.

23 Claims, 7 Drawing Sheets

| 501 | 503 | 513 | 517 |
|---|---|---|---|
| OS Application Programming Interfaces (API) (2D) | JVM OS (Platform Dependent/ Specific) | Java Applications | Topological API Framework (3D) |
| | | 515 | 519 |
| | | JVM Platform Independent | Topological Render Framework (3D) |
| | | | Converter/Filter — 518 |
| | | 505 | 521 |
| | | NATIVE OS SERVICES Application Programming Interfaces (2D); Kernel (ASM, C, etc.) (2D); Device Drivers (2D) | Topological Device Independent Transport |
| | | 511 | |
| | | HARDWARE -Display -Graphics Card, etc. | |

METHOD, SYSTEM AND PROGRAM FOR TOPOGRAPHICALLY AWARE OPERATING SYSTEM

BACKGROUND OF THE INVENTION

1. Technical Field

The present invention relates in general to improved computer systems, and in particular to an improved computer system which supports topographical interfacing. Still more particularly, the present invention relates to an improved computer system which supports platform and application independent topographical interfacing utilizing a topographically aware operating system (OS).

2. Description of the Prior Art

Data processing systems typically rely on at least one if not multiple peripheral devices in order to receive inputs and/or transmit outputs to provide human-computer interactions. Presently, typical display devices may include, for example, a display monitor, an overhead projection monitor, or other alternate device by which data may be displayed in a visual manner from a data processing system. These display devices may be utilized to convey a wide range of information; however they are typically limited to conveying information in two-dimension (2D). While graphical achievements have been made in order to display a seemingly three-dimensional (3D) object, the three-dimensional world is still limited to two-dimensional visual representation with typical display devices.

Various methods have been presented to provide either three dimensional and/or topographical interfacing. These methods are typically limited in that they exist within closed systems and only provide support for individual topographical attributes. U.S. Pat. No. 5,701,444, for example, provides a three dimensional graphics subsystem with enhanced support for graphical user interface. The subsystem is a rendering subsystem which is able to handle both 2D and 3D rendering tasks. Only the 2D rendering is controlled by the operating system (OS). The 3D rendering is loaded into a pipeline and only one type of rendering may be applied at a time. A special hardware card is utilized to render the 3D.

Two other closed systems designed specifically for computer aided design (CAD) applications are U.S. Pat. Nos. 5,903,270 and 4,888,713. The former discloses a simultaneous display of two windows—one in three dimension and the other in two-dimension—and permits for placing texture information on the objects utilizing a projection method. The latter teaches providing surface detail to graphic images of apparel., i.e. a texture mapping technique.

U.S. Pat. No. 5,903,278 discloses a color encoding of objects to convey embedded information about the image utilizing primitives within a graphics library. U.S. Pat. No. 5,864,343 discloses 3D motion effects in a 2D GUI, utilizing a relative depth value. This permits the objects further away to move slower than the objects which are closer and thus introduce effects of realism to the 2D graphics computer system. A library of predetermined 2D images and sounds and graphics toolkit routines is utilized. U.S. Pat. No. 5,905,503 discloses a rendering application which utilizes a database of light source (illumination) information to render the images. U.S. Pat. No. 5,835,096 discloses a rendering system using 3D texture-processing hardware for accelerated 2D rendering. This method utilizes a separate texture sub-processor optimized for texturing operations in a 3D mode.

U.S. Pat. No. 5,880,733 discloses artificial depth perspective, i.e. a 3D perspective. The user utilizes buttons provided within the application window to transform a typical 2D window into a 3D perspective, virtual work space. This invention provides only a 3D display even when an item is not 3D. The control buttons control the position of the display windows on the various planes of the display system and re-sizes the sides of the window area.

Finally, U.S. Pat. No. 5,729,671 discloses a rendering of a 3D surface Image on a 2D display using an object oriented framework. The framework utilizes vertex data to create the third dimension. The process uses triangles to form a surface on the attached display after first receiving the plurality of vertices into memory and storing them.

Several major limitations exist in these prior attempts to provide some 3D or topographical interface. As previously mentioned, they apply primarily to closed systems or platform or application dependent systems. Alternately, they only support specific limited topographical elements/attributes.

Present enterprise native applications depend on the OS to perform the underlying 2D rendering of a collection of complex graphical objects for output devices. Application frameworks exist on which 2D applications can use application programming interfaces (APIs) to accomplish their programming tasks. However, there is currently no method of doing so in 3D. It is very costly to expect OS enterprise stack applications to generate 3D data since current 3D hardware device surface input is not supported by the 2D OS that the applications were developed for. In some cases it is not possible to re-compile existing 2D legacy applications.

In java based systems which utilize a java virtual machine (JVM), these problems are even more obvious. Java systems permit a wider range of topographical attributes to be associated with their objects and provides the command structure to implement these additional attributes. However, since current java systems operate with a traditional native, platform-specific OS, they do not support extended topographical interfaces. Each present system utilizes a specific hardware and/or application modules for the particular closed system. These modules cannot be extended to other platforms and/or applications and support only the preprogrammed topographical attributes.

A list of the problems currently being faced within the computer industry with respect to the prior efforts to implement 3D and topographical systems within java based systems includes:

(1) Legacy JVM's today are aware in 2-D fashion only (x,y);

(2) JVM's today, which require a topographical input/output device, have to coexist with existing I/O devices (display, audio, keyboard and mouse) and not negatively impact performance;

(3) JVM's today need to incorporate a closed loop control feedback system in order to support a topographical device (frameworks are needed to generically handle 3D bi-directional feedback from the user and display 3D topographical data;

(4) There are problems in converting legacy 2D information and 3D topographical information into topographical device specific information; and (5) Needs of topographical input and output devices are different than typical devices attached to JVM operating system.

Some of the expanded needs are (a) the ability to zoom in/out on a co-ordinate space, (b) synchronize movements right/left in fixed increments that do not match the OS dimensions (screen, application programming models such as AWT), (c) division of the display area into clipping regions necessary in order to convert a high resolution device into a low resolution device, (d) division of the topographical play surface into regions so that different co-ordinate spaces can be displayed (this is also useful for providing additional content on the play area such as a button used for topographical control), (e) conversion of graphical elements such as drawings primitives, colors, and text into the third dimension (also z ordering of windows to cumulatively create the third dimension), (f) mapping third dimension into a topographical depth (xbits/topographical characteristics unit if measurement), (g) provide the desktop data necessary for replaying primitive graphics calls by the topographical device manager for each topographical device, and (h) applying topographical characteristics (for example, height, temperature, intensity, roughness, compression, springiness) to drawing primitives.

In light of these limitations within the existing systems, the present invention recognizes that a need exists for a unified system for supporting 3D and topographical information within a computer system. It would be desirable to have an OS which permits implementation of 3D and topographical support. It would be further desirable for such an OS to be application and platform independent and associated with a JVM to permit topographically aware object-oriented environment.

SUMMARY OF THE INVENTION

In view of the foregoing, it is therefore one object of the present invention to provide an improved computer system.

It is another object of the present invention to provide an improved computer system, which provides for topographical interfacing.

It is yet another object of the present invention to provide an improved computer system, which supports platform and application independent topographical interfacing utilizing topographical aware JVM enabled operating system (OS).

In accordance with a preferred embodiment of the method and system of the present invention, a topographical aware Operating System (OS) which is platform and application independent is provided. The OS contains a 2D to 3D rendering converter within a topographical framework, a java virtual machine (JVM) interface and topographical application programming interface (APIs). The OS operates within a 2D environment and is capable of receiving input from a topographical input device and generate topographical output to a topographical or 2D output device. More specifically, the OS is enabled to render 2D input to 2D output, 2D input to 3D output, 3D input to 2D output, and 3D input to 3D output, each of which is not dependent (independent) on any application layer. The OS further contains means for converting topographical input signals into topographical output, independent of which platform or application is running on the data processing system. In the preferred embodiment, the JVM operates within an OS environment and the topographical attributes enabled within the JVM environment include height, temperature, roughness, intensity, color, illumination, springiness etc. In another preferred embodiment, a topographical selection graphical user interface (GUI) is provided by which the OS may dynamically select attributes, etc. or allow user selection of particular attributes to apply to an object.

All objects, features, and advantages of the present invention will become apparent in the following detailed written description.

DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DESCRIPTION OF A PREFERRED EMBODIMENT

The present invention may be executed in a variety of systems, including a variety of computers under a number of different operating systems. The computer may be, for example, a personal computer, a network computer, a mid-range computer or a mainframe computer. In addition, the computer may be a stand-alone system or part of a network such as a local-area network (LAN) or a wide-area network (WAN).

Figure 1:
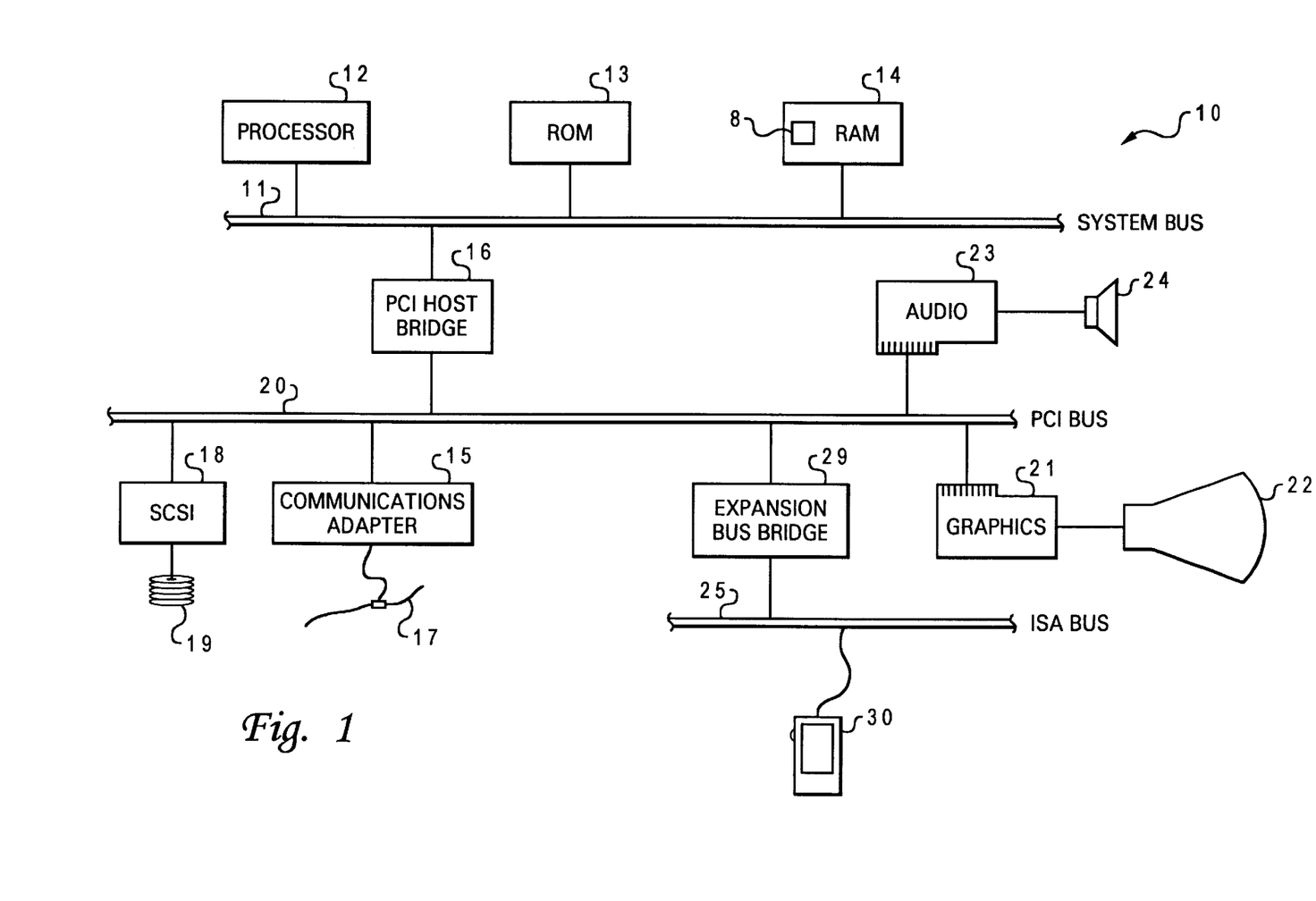
FIG. 1 depicts a block diagram of a typical computer system that may utilize a preferred embodiment of the present invention.

Referring now to the drawings and in particular to FIG. 1, there is depicted a block diagram of a typical computer system 10 that may utilize a preferred embodiment of the present invention. As shown, a processor (CPU) 12, a read-only memory (ROM) 13, and a Random-Access Memory (RAM) 14 are connected to a system bus 11 of a computer system 10. CPU 12, ROM 13, and RAM 14 are also coupled to a PCI local bus 20 of computer system 10 through a PCI host bridge 16. PCI Host Bridge 16 provides a low latency path through which processor 12 may directly access PCI devices mapped anywhere within bus memory and/or I/O address spaces. PCI Host Bridge 16 also provides a high bandwidth path for allowing PCI devices to directly access RAM 14.

Also attaching to PCI local bus 20 are communications adapter 15, small computer system interface (SCSI) 18, and expansion bus bridge 29. Communications adapter 15 is for connecting computer system 10 to a network 17. SCSI 18 is utilized to control high-speed SCSI disk drive 19. Expansion bus bridge 29, such as a PCI-to-ISA bus bridge, may be utilized for coupling ISA bus 25 to PCI local bus 20. As shown, a topographical interface system 30 is attached to ISA bus 25 for performing certain basic I/O functions. In addition, an audio adapter 23 is attached to PCI local bus 20 for controlling audio output through speaker 24. In alternate embodiments of the present invention, additional peripheral components may be added.

Computer system 10 also preferably includes an interface such as a graphical user interface (GUI) and an operating system (OS) that reside within machine readable media to direct the operation of computer system 10. In the preferred embodiment, OS (and GUI) contains additional functional components which permit OS to be topographically aware and enable topographical I/O processing and control independent of the program applications or platform running on computer system 10. Any suitable machine-readable media may retain the GUI and OS, such as RAM 14, ROM 13, SCSI disk drive 19, and other disk and/or tape drive (e.g. magnetic diskette, magnetic tape, CD-ROM, optical disk, or other suitable storage media). Any suitable GUI and OS may direct CPU 12. For example, the AIX operating system is one of IBM's operating systems, which may be implemented.

Further, computer system 10 preferably includes at least one software application (e.g. program product) that resides within machine readable media, for example a topographically enabled application 8 within RAM 14. A software application contains instructions that when executed on CPU 12 interact with modified OS of the invention to execute the operations depicted in the flow chart of FIG. 6 and other figures described herein.

This invention provides a method for 3D and topographical interaction with computer OS. It provides 3D and topographical support in the form of a framework, which may be comprised of a combination of hardware, software and firmware, and which is transparent to applications to enable a 2D screen scrape into a 3D and topographical surface. The invention also manages 3D and topographical input from hardware. The invention operates with an open system, i.e., a system which is not application or hardware specific (or dependent). It is thus a device independent, and application independent, topographical rendering framework. In the preferred embodiment, the framework is a JVM framework utilizing applicable elements of object-oriented programming.

In a preferred embodiment, the invention is implemented in the java programming language using object-oriented programming techniques. As will be understood by those skilled in the art, object-oriented programming (OOP) objects are software entities comprising data structures and operations on data. Together, these elements enable objects to model virtually any real-world entity in terms of its characteristics, represented by its data elements, and its behavior, represented by its data manipulation functions. In this way, objects can be made to model concrete things with their associated attributes and shapes.

Object-oriented programming utilizes a framework approach to application development. The invention, in one embodiment, presents a framework for topographical interfacing. Thus, a topographical framework, a set of object classes that collaborate to execute defined sets of computing responsibilities, operates as part of the OS, illuminating the need for specific device dependency.

In the same way that an application framework provides the developer with prefabricated functionality, OS frameworks, such as is included in a preferred embodiment, leverage the same concept by providing system level services, which developers, such as system programmers, use to subclass/override and create customized solutions.

In one preferred embodiment, as shown in FIG. 1, a program application resident in the RAM 14, and under the control of the CPU 12, is responsible for managing various tasks using an object-oriented graphic framework of the OS.

Figure 2:
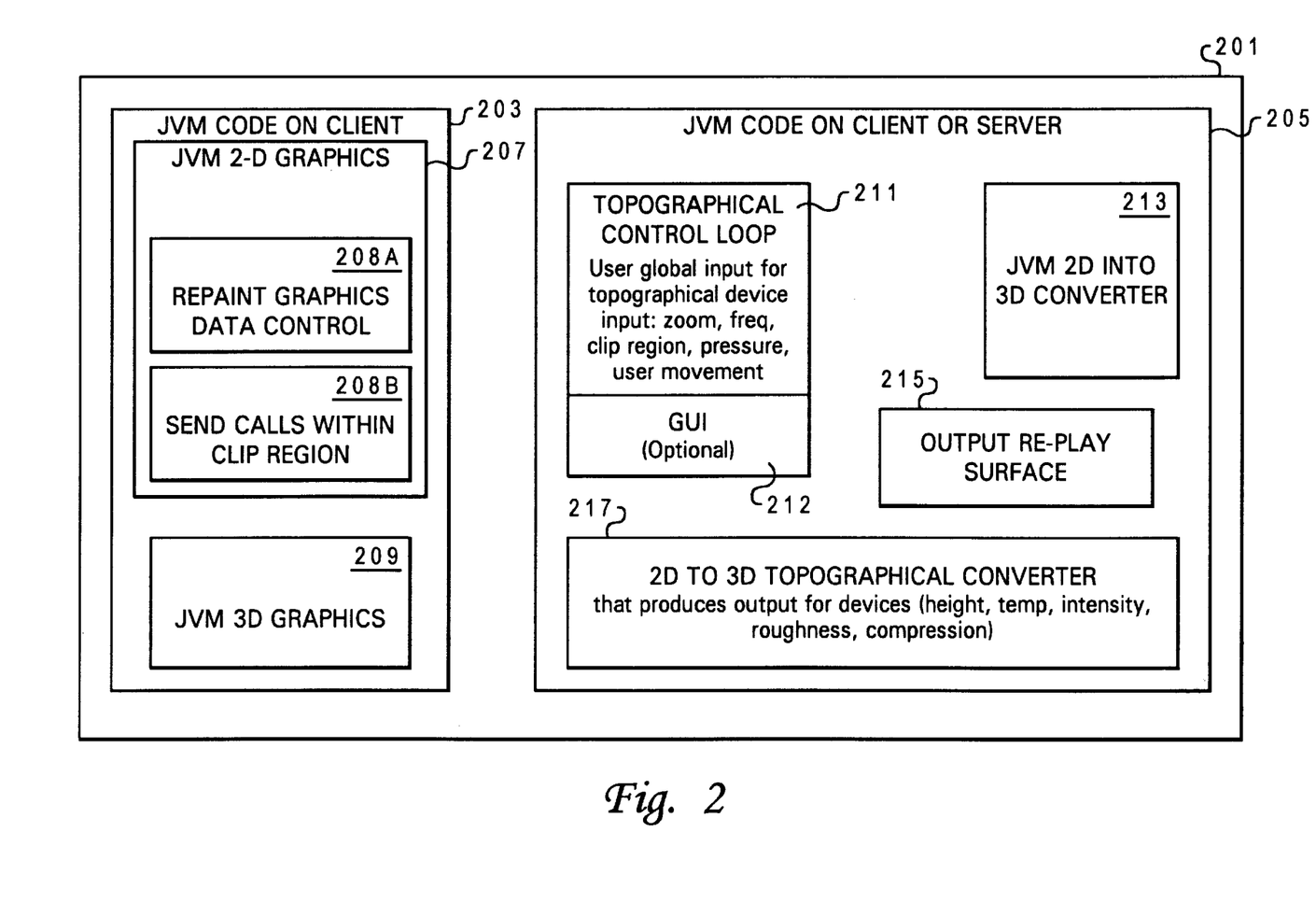
FIG. 2 illustrates a block diagram of hardware and firmware layers of a framework in accordance with one embodiment of the present invention.

FIG. 2 illustrates a JVM topographical device-independent framework. In one preferred embodiment, the framework exists as a component of the OS program code. In other embodiments, the framework is implemented as a separate program code which is called by the OS to enable topographical events. The framework 201 contains a first module with JVM code on client 203 and a second module with JVM code on client or server 205. JVM code on server occurs when the output device is connected via a network. JVM code on client module 203 contains JVM 2D Graphics 207 and JVM 3D graphics 209. JVM 2D graphics includes a repaint graphic data control 208A and a send calls within clip region (device requested) 208B. JVM code on client or sever module 205 interacts with JVM code on client module 203 via clip regions, which includes graphics and data. It contains a topographical control loop (TCL) 211 which provides user global inputs for topographical device input, such as zoom, frequency, clip region, pressure and user movement.

TCL 211 may be an opened or closed loop depending on the developer's preference. TCL 211 is a component part of the render control for topographical device-independent framework. In the TCL, topographical input device (hardware) listeners wait for input (i.e., they "listen" for topographical input including pressure, zoom, frequency, clip region (spatial input), and speed). When the input is received, the listener awaits the user selection of the render button or zoom button. This causes the device-independent transport to be activated and the retrieval of the 3D topographical data occurs. The graphics calls are then re-played. The TCL communicates with topographical user input buttons, etc., and monitors events such as mouse movement and distance, and joystick movement and pressure. TCL is provided device feedback with device independent topographical data. The TCL then sends the topographical input to the specific topographical hardware as will be further described below.

Beneath topographical control loop is a graphical user interface (GUI) 212, which enables the topographical output. GUI 212, which is optional, is used to instantiate the converter or filter object. The GUI produces the converters utilized within the invention. A preferred embodiment of GUI 212 is presented and further described with reference to FIG. 7 below.

JVM code on client or server module 205 also contains a JVM 2D to 3D converter 213 and an output topographical device (re-play surface) 215. The processing of input data signals to output attributes in the present invention occurs primarily within 2D to 3D topographical converter module 217 that produces output for devices (i.e., permits the rendering of the objects) including height, temperature, intensity, roughness, springiness and compression. JVM topographical device independent framework 201 is connected to topographical user input and user output, which provides device independent topographical data on a topographical render surface.

Figure 3:
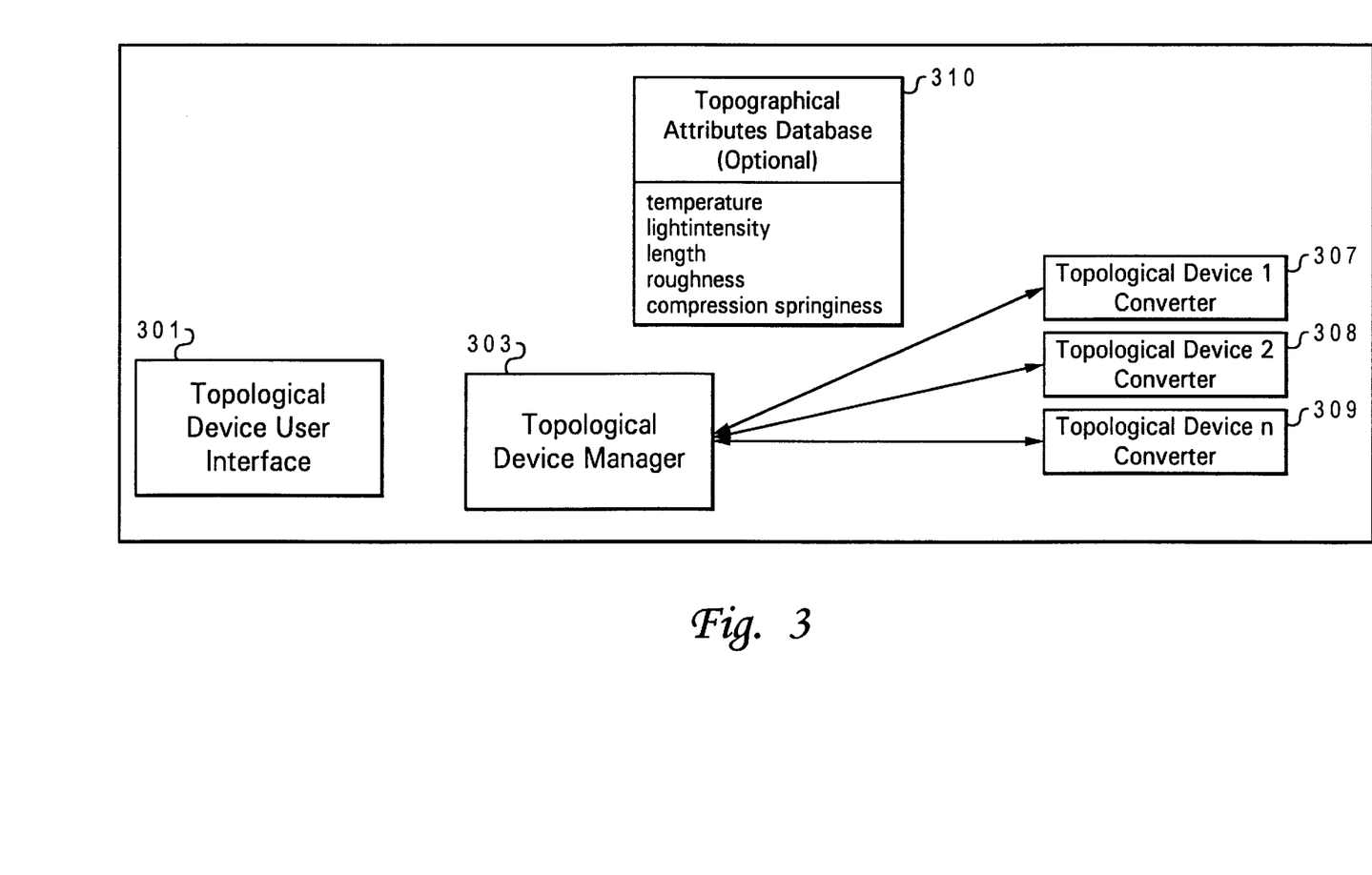
FIG. 3 depicts a device specific framework with specific topographical converters in accordance with one embodiment of the present invention.

FIG. 3 illustrates an alternate topographical device specific framework which supports several different topographical devices. The topographical device user interface 301 contains device specific properties and device shared properties such as zoom (x,y,z). Topographical device manager 303 determines which topographical device is required to convert the particular topographical input signal based on a database of attribute specific identifiers and characteristics, and selects the applicable converter. Several topographical device converters or filters are illustrated ranging from device 1 307, device 2 308 to device n 309. Device 1 307 may be, for example, a temperature converter, while device 2 308 is a roughness converter and device n 309 is an illumination converter. In one preferred embodiment, an optional topographical database 310 is used to store user configuration data. Topographical device manager operates for light intensity, length, roughness, temperature, and compression springiness, and other types of topographical attributes each of which has its respective converter. The converters are implemented utilizing software code resident within OS code or linked as a sub-routine to OS code. Applicable hardware and/or firmware devices are provided with output from the converters to render the particular attribute.

Figure 4:
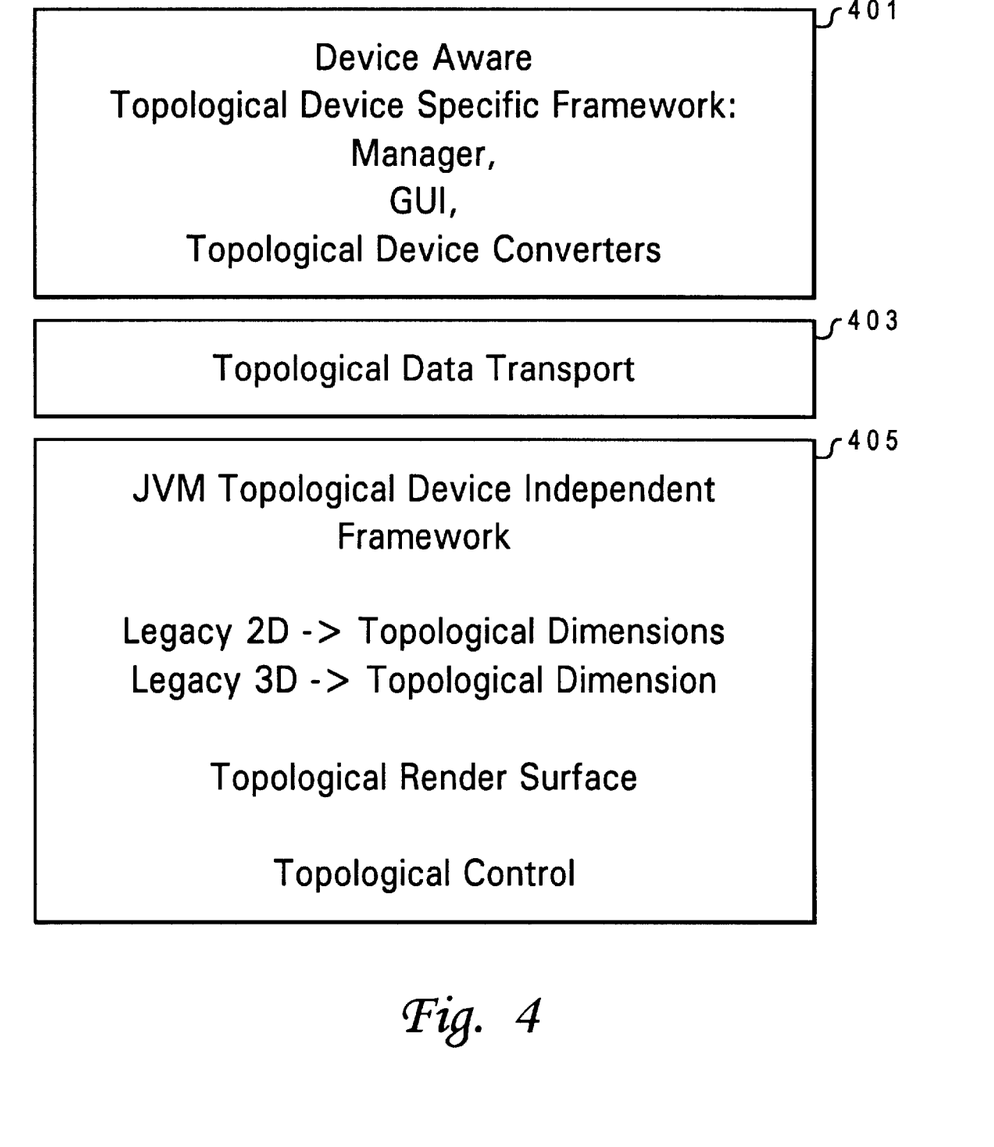
FIG. 4 illustrates a block diagram of the three main layers within the topographically aware JVM system accordance with a preferred embodiment of the present invention.

FIG. 4 illustrates the various layers of topographical aware JVM system. Layer 1 is the device aware layer 401 or the topographical device-specific framework. Topographical device specific framework includes topographical user input (USER INPUT (UI)), topographical device manager, and topographical device converters (generic topographical data into device specific). The middle layer is the topographical data transport layer 403, which serves as an interface between topographical device-specific framework 401 and device-independent framework 405. A data medium is used to transport information between the topographical device manager and the underlying JVM. It provides connectivity such as (but not limited to) a parallel port or serial port or network connection. Device independent framework 405 includes a legacy 2D and 3D to topographical converter, a topographical render surface and topographical control.

This invention provides a specific method for a java virtual machine (JVM) based computer operating system and a general approach to an object-oriented GUI to produce topographical input/output data for a topographical device. In the case of an operating system or platform, extensions to the APIs for input devices (typically mouse and keyboard today) as well as extensions to APIs in output devices (display, printers) are needed to handle a third topographical dimension. This topographical dimension can be then converted into the form of topographical output data and includes physical height dimension (length), temperature (hot or cold), light intensity (bright or dark), coefficient of friction (rough or smooth), compression factor (hard or soft), etc.

Topographical device hardware specific-software is needed to convert the generic topographical data into device specific data that can control the underlying hardware. Input from the topographical device is also fed back to the topographical aware JVM OS. Conversion of the generic to hardware specific data is accomplished with converters.

In the JVM framework, interfaces supported include, by the converter classes if implemented (or given a Topographical default):

getTopographicalHeight;
getTopographicalTemperature;
getTopographicalRoughness;
getTopographicalCompression; and
getTopographicalLightIntensity.

The topographical aware JVM OS has the ability to convert 2D and 3D legacy data into topographical data, taking user input from the topographical manager and replaying the graphics calls with 3D height, converting 3D height into each topographical dimension. The invention recognizes that some graphics primitives will have some topographical attributes and others will not. In one embodiment, the invention implements the converting of 2D legacy data into 3D data for output with the following considerations: (1) One basis of height algorithm is color (light colors would have a larger height than darker colors); (2) another basis of height is edges (edges are higher than middle surfaces); (3) the base height accumulates if an Advanced Windowing Toolkit (AWT) primitive (containers, canvas, buttons, etc.) is placed on top of another AWT primitive; and (4) clip regions are used to limit the amount of data sent to the topographical device.

Another method of mapping legacy programs to the new device can be achieved by using color values and edges. Some conventions for making 2D things look 3D include drawing highlight lines (typically top and left sides for raised objects, reversed to lowered objects) and shadow lines (typically bottom and right sides for raised objects, reversed for lowered objects). The invention recognizes that by detecting this convention it is possible to take the apparent 3D representation that was rendered in 2D, and in fact render it in 3D on the device.

Figure 5:
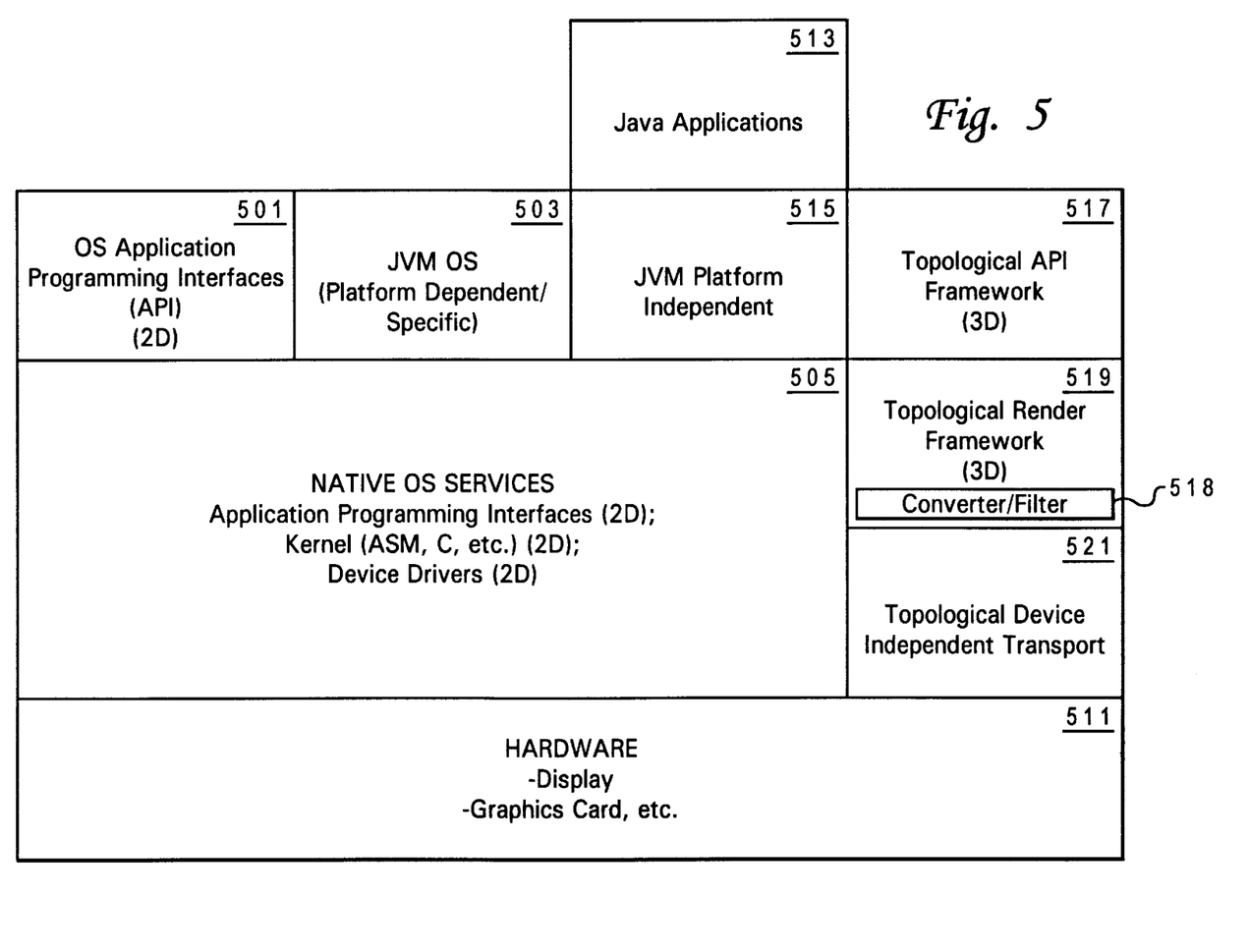
FIG. 5 depicts a block diagram of the OS layout with topographically aware JVM system in accordance with a preferred embodiment of the present invention.

FIG. 5 depicts a block diagram representation of framework layers in accordance with one preferred embodiment of the invention. Layers are comprised of hardware or software or firmware either individually or in combination. Each layer beginning at the bottommost hardware layer 511 and the OS layer 505 provides the support required for the layer above it. Those skilled in the art are familiar with layering configuration and can appreciate that the invention utilizes several new configuration of layers within an internal configurable computer system in its implementation. In FIG. 5, new layers have been added to the framework to implement the processes of enabling a 3D topographical device independent framework/OS in JVM environment. Four columns of layers are illustrated representing major functional areas which operate individually (and/or together) to carry out the processing within a computer system and specifically the processes of the current invention. Each column thus consists of a number of layers which together may function as a complete unit, i.e., having the required components to support the required functional processes.

In the first column are the Application Programming Interfaces (API) 501 which are platform specific sitting atop the Native OS 505, which supports 2D applications. Native OS 505 in turns sits on top of the underlying hardware layer 511. Next to the APIs 501 is the JVM OS 503, which is platform dependent and which provides support for JVM operations. Below JVM OS 503 is the Native OS 505, which is enabled for JVM 2D interfacing. Native OS 505 contains (1) OS kernel, made up of the software programming language code, for example C or ASM, and (2) the OS device drivers (DD), both of which supports 2D interfacing. The underlying hardware layer 511 includes display and graphics cards, etc. As mentioned, most of the previous components are utilized to provide interfacing support for 2D applications and 2D input and output. The invention permits standard input devices, such as a mouse, to be utilized to provide 3D topographical input (regular topographical parameters) plus speed of movement to yield blurred images by render engines in both mouse (isotonic input) and joystick (isometric input) from topographical sources including temp, light, springiness, roughness and length.

In the present invention, the JVM OS 503 is expanded to connect to a JVM module 515 which is platform independent. Running on the JVM module 515 which is platform independent are java applications 513. The topographical API (3D) framework 517 extends from the JVM module 515 which is platform independent. This allows framework 517 to interface with any JVM applications, making it application and platform independent. Topographical API (3D) framework 517 is then coupled to topographical render framework 519, which includes a converter/filter 518. Below topographical render framework 519 is a topographical device independent transport module 521 which control the flow of topographical output. Converter/filter 518 software controls the rendering of the topographical attributes within topographical render framework 519.

As previously mentioned, the framework provides the enabling of legacy 2D rendering engines to provide 3D topographical height data as well as other topographical characteristics (such as, TopographicalHeight, TopographicalTemperature, TopographicalRoughness, TopographicalCompression, TopographicalLightIntensity). In one embodiment, a topographical depth index is used to determine height. Each additional topographical characteristic would be applied to each drawing primitive class as follows:

Box.getTopographicalHeight;

Box.getTopographicalTemperature; or

String.getTopographicalHeight, etc.

A topographical render surface (bitmap image) is created for the topographical manager by replaying the graphics calls for a desktop, based on the clip regions received from the topographical device for the desired topographical characteristic. Conversely, a topographical device could replace topographical classes that produce this drawing surface to customize the conversion of topographical data into topographical device specific data.

In the JVM device independent framework, the 2D graphics APIs and 2D macro graphics APIs are enabled. Specifically, the invention provides an Application Topographical Programming Interface (ATPI) for drawing graphical primitives such as drawline, drawstring, drawbitmap, etc. These include attributes light, and temp, etc. The invention also provides application topographical programming interface (ATPI) for drawing graphical macros (collection of primitives) such as drawBox, drawButton, etc. The invention permits the creation and storage of 3D topographical dimension for output device without changing the underlying program. It generates 2D graphics API calls from macro, stores macro calls, retrieves 2D graphics API calls and executes each call. This permits the application to run unaware of the 3D conversion which are occurring with its macro calls.

Figure 6:
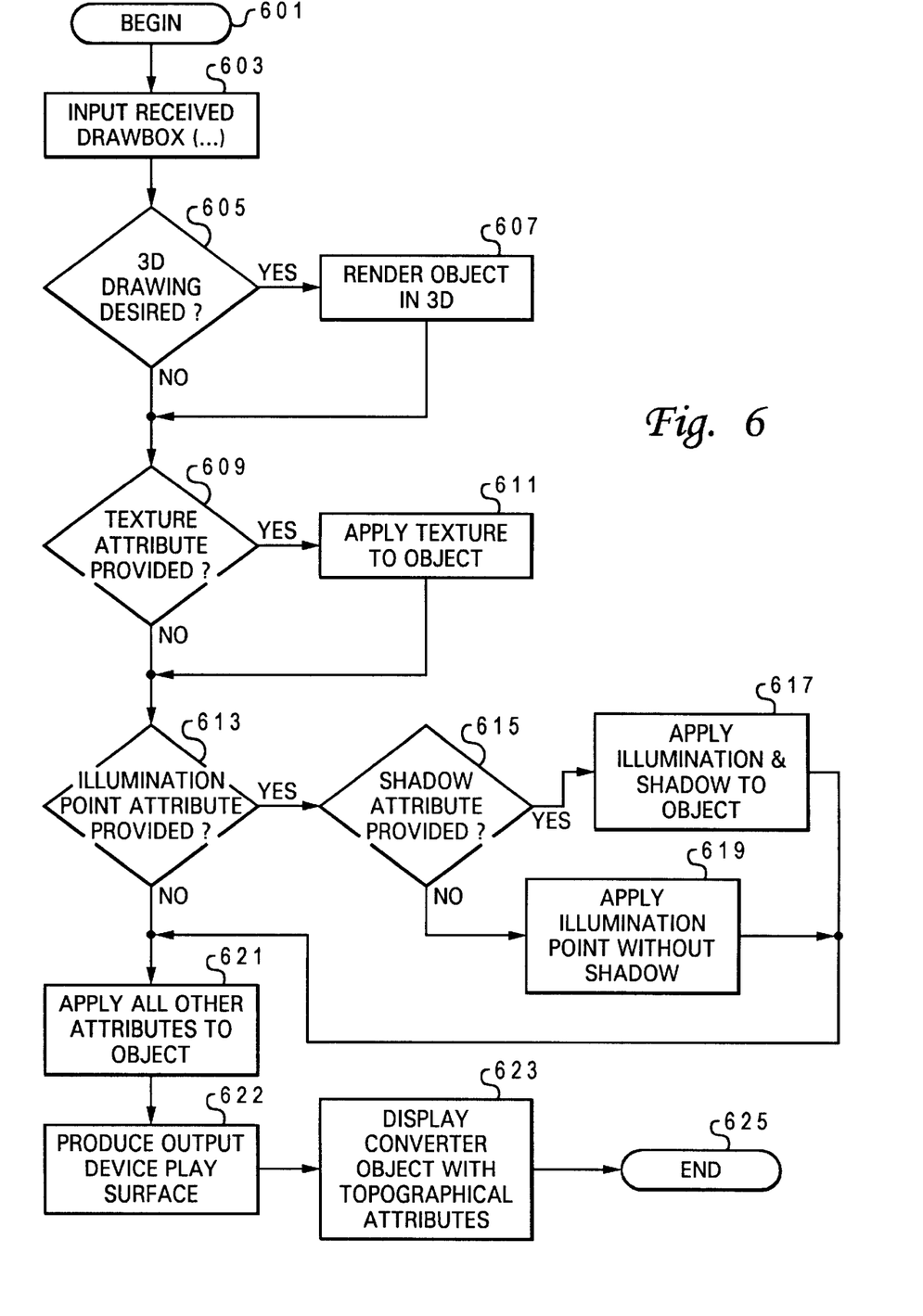
FIG. 6 depicts a high level logic flowchart of a process for evaluating and displaying topographical graphic output utilizing a topographical JVM OS framework in accordance with a preferred embodiment of the present invention.

Turning now to FIG. 6, there is depicted a high level flow chart of the processes of one preferred implementation of the invention. In this implementation, several different topographical attributes are configured within the framework and applied to each display object as necessary. The process begins at block 601. A command or input is received to draw a box in block 603. The OS analyzes the input/command to determine if a 3D drawing is desired at block 605. If a 3D output is desired, the OS triggers the rendering converter to render the object in 3D on the output device (device drivers) at block 607. The input command is again analyzed by the OS for possible texture information. This permits a determination to be made on the roughness of the object (or coefficient of friction) at block 609. If texture information is present, then the edges of the object are rendered with the texture applied at block 611. The process of analyzing for each topographical attribute may be completed initially by the OS and the applying/rendering of the attribute within the object completed thereafter. For the purpose of this illustration, it is assumed that all remaining queries have already been made. A check is made to determine if an illumination point is provided at block 613 and whether a shadow is to be illustrated at block 615. If a shadow is to be presented then the box is illustrated as raised at block 617. Otherwise, only the illumination point is applied at block 619. All other attributes are then applied to the rendering of the object in catch-all block 621. An output device play surface is then produced at block 622. The converter (producer/filter) then sends the 2D or 3D topographical output to the output device and causes the object to be displayed on the display or output with its topographical attributes using output device hardware at block 623. The process then ends at block 625. In block 624, the converter sends the information to the specific topographical hardware component. The process illustrated herein has been presented as a single complete unit, however, the invention contemplates that any block may be expanded upon to include other elements or that each block may be presented in different spatial relation to each other in the flow of the process. Also, other process steps may be included. For example, an internal determination of whether the output should be in 2D or 3D with either choice resulting in particular topographical output converter calls and corresponding topographical devices being utilized.

Figure 7:
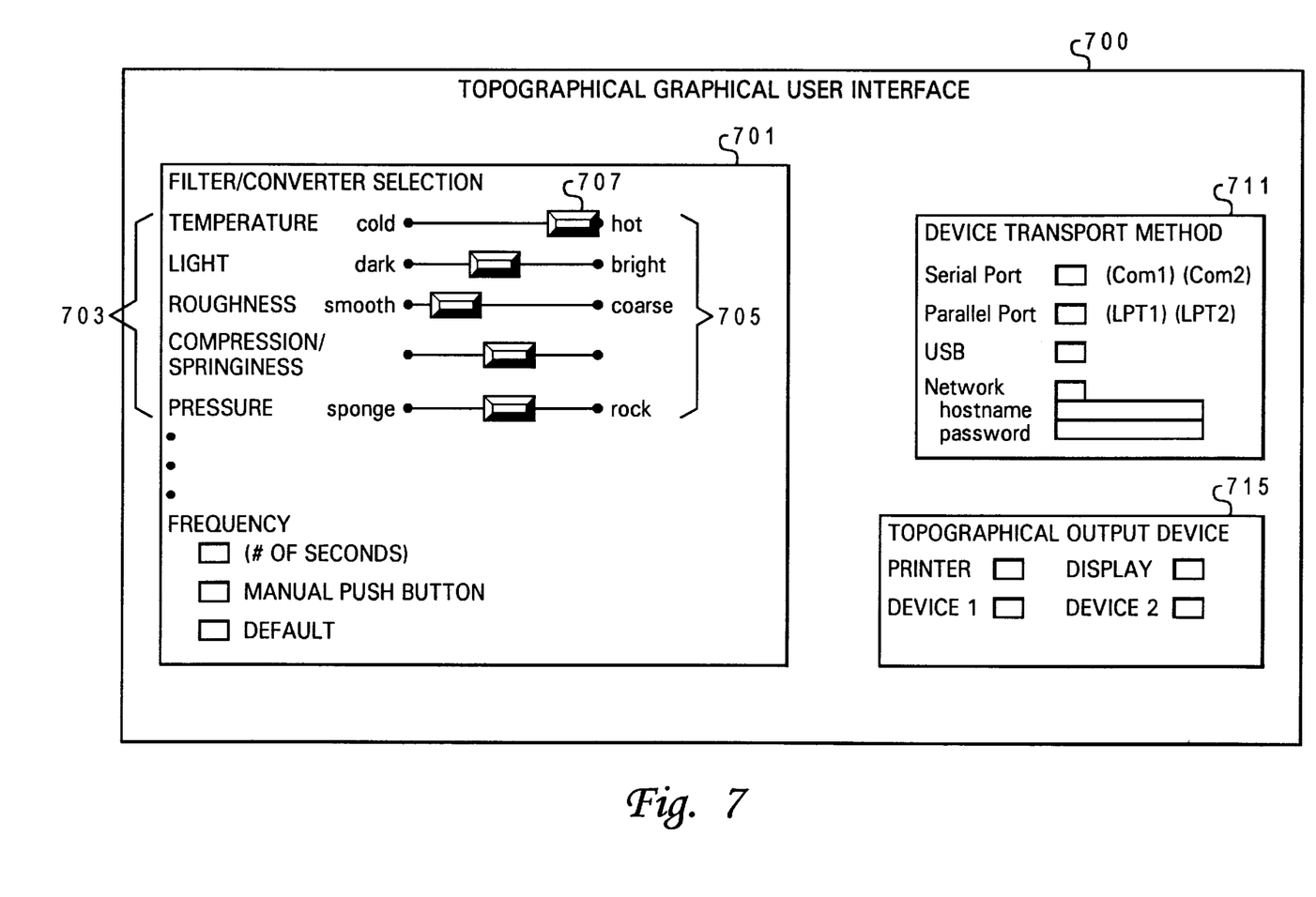
FIG. 7 depicts a graphical user interface by which the rendering functions of the converter are implemented in one preferred embodiment of the invention.

FIG. 7 illustrates a GUI 700 utilized to implement the converter/filter functionality of the present invention. Three selection windows are presented having different elements. The first attribute selection window 701, includes a list of the topographical attributes which may be selected by a user to apply to an object. Each attribute 703 has a corresponding selection range 705 besides it. The selection range 705 permits a selection of the level/value of the particular attribute 703 to apply to the object. For example, the temperature attribute's scale goes from cold to hot. A user may select hot by moving the sliding bar 707 all the way to the right most side of the scale as depicted. In an implementation using a temperature sensitive output device, this causes the output surface temperature to rise. With a 2D output device, temperature of an object may be represented by color wherein blue is used to represent cold and red is used to represent hot. The actual color of the objects changes from blue to red as the sliding bar 707 is moved across the range 705. Several attributes include sub-elements. As shown, render frequency may be selected based on time (seconds), the user's manual push of the mouse button, or a default value of the OS. In one embodiment, all attributes are provided with a default value, or turned "off" until a specific topographical input/output is detected for that attribute at which time the setting is dynamically instantiated. Based on the user configuration input, the correct topographical converter (filter or data producer) object is substantiated. Thus, the operating system can dynamically install new topographical filters or converters based on user choices.

The second window is the transport window 711. Transport window 711 contains user selectable elements which determine how the topographical input/output is transmitted within the data processing system. Elements include (but are not limited to), the serial port, USB ports, and network information. In the presented illustration, when a network transmission is selected, the user is prompted for a hostname and password. Based on the user transport configuration input, the proper transport object is instantiated. This transport has a device independent interface by which the topographical output device producer sends data to the underlining topographical hardware which can be a 2D or 3D device.

The third window is the topographical output device window 715. This window allows the window or the converter (in a dynamic implementation) to select which output device to send the object to. The device is represented by its device name and includes printer, monitor, etc.

The invention contemplates utilizing multiple attributes within an object, (e.g., multiple texture and or light sources being applied to the same object. Also, the API macro (e.g. drawbox) and primitive API are both supported. Thus the invention supports both graphics API and graphics AP macros.

In one embodiment, the conventions utilized by the OS represent most of the topographical attributes in pairs. These attributes include name, size, location, intensity, temperature, height, etc. Thus in the above illustrative embodiment of the invention when the topographical element roughness is utilized, a roughness coefficient (epsilon) is provided. (i.e., "Drawbox getroughness" command is provided within the framework.) In one implementation, a rough object may be illustrated as a stripped yellow box, while a smooth object is merely illustrated as a yellow box. Similarly the display of shadow on the object is illustrated as a raised box, while no shadow is illustrated as a regular box. The getIntensity display driver has either a bold or regular output.

One major exception to the above convention however, occurs with the 3D rendering of objects. The 3D device has a z coordinate added as an attribute and the framework is provided with spatial coordinates (x,y,z).

An example command which would be used to create a 3 dimensional object with other topographical attributes is:

drawstring (x,y,z, smooth, hot, bright).

The OS analyzes the elements of this command irrespective of its source (application or program independent) and applies the attributes to the object through the framework components (converter, etc.). The invention operates irrespective of the OS whether NT, OS/2, JVM, etc. and their related programming interfaces. The processes involve dissecting objects into drawing primitives on behalf of the device driver, clipping out unnecessary calls and applying the primitive to represent the object with topographical information. In a JVM system, the AWT graphics engine sends calls within the region to render processes. AWT application includes a new button, button.application text ("text"), button.draw (x,y) which is sent to the AWT engine and causes the device drivers to produce the object.

Some of the expected benefits of the present invention include:

(1) no native code impacts (video blast routines not hooked or used);

(2) no new event structures used (where the corresponding mouse/keyboard events are unchanged);

(3) the framework could lie at the application layer or with the JVM;

(4) high level graphics calls used instead of the bit-blast routines are easier to convert into edges (touch), sounds (audio) and light intensity (vision);

(5) a sliding fixed increments window box is used to view the whole application space. This is particularly useful for low resolutions when some of the desktop is clipped off the display. Rather than pushing a slide bar the user could view the mouse at the maximum application dimension in the JVM regardless of the resolution;

(6) different topographical converters (audio, light, touch) can be used for each type topographical device;

(7) useful in an application in which visual senses are limited (due to dark environment or handicapped user), wherein distance can be used along with temperature or light intensity; and (8) useful to provide data not available to users today such as the roughness of an object's surface or how hard the object is.

As has been described, the present invention provides an improved method and system for topographical interfacing. In particular, one example of the application of the present invention has been depicted in FIG. 6, however alternate applications of the present invention are also suitable. In addition, in other applications, the topographical interface system may be utilized in conjunction with other peripherals.

It is also important to note that, although the present invention has been described in the context of a fully functional computer system, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal bearing media include, but are not limited to, recordable-type media such as floppy disks or CD ROMs and transmission-type media such as analogue or digital communications links.

While the invention has been particularly shown and described with reference to a preferred embodiment, it will be understood by those skilled in the art that various changes in form and detail may be made therein without departing from the spirit and scope of the invention.

What is claimed is:

1. A data processing system comprising:

an operating system having means to render 2D data into 3D data to a given application layer, wherein said 2D data originates from at least one of a 2D application, a 3D application, a 2D operating system (OS), and a 3D OS; and means for enabling output using the 3D data to a 3D topographical device independently of the given application layer.

2. The data processing system of claim 1, wherein said 3D data includes topographical attributes from among three dimension (3D) representation, intensity, heat, illumination, light source, shadowing, color, height, springiness, and roughness.

3. A data processing system comprising:

an operating system having means to render 3D data into 2D data to a given application layer, wherein said 3D data originates from at least one of a 2D application, a 3D application, a 2D operating system (OS), and a 3D OS; and means for enabling output using the 2D data, which was rendered from the 3D data, to a 2D topographical device independently of the given application layer.

4. The data processing system of claim 3, wherein said 3D data includes topographical attributes from among three dimension (3D) representation, intensity, heat, illumination, light source, shadowing, color, height, springiness, and roughness originates from at least one of a 2D application, a 3D application, a 2D operating system (OS), and a 3D OS.

5. A data processing system comprising:

means for accepting topographical and two-dimensional (2D) input, wherein said topographical input includes one or more attributes from among: three dimension (3D) representation, intensity, heat, illumination, light source, shadowing, color, height, springiness, and roughness;

means for rendering said topographical input into a respective topographical output, independent of program applications and platforms running on said data processing system;

means for outputting said topographical output.

6. The data processing system of claim 5, further comprising a java virtual machine (JVM) framework having an operating environment which interacts with the rendering and displaying means to effectuate object-oriented topographical processing.

7. The data processing system of claim 6 wherein said operating environment accepts application topographical programming interfaces (ATPIs) for drawing graphical primitives and for drawing graphical macros, wherein said rendering means includes:

means for interpreting said topographical information within said ATPIs; and means for applying said topographical information to an object.

8. The data processing system of claim 5, wherein said accepting means further includes means for monitoring for said topographical input from topographical sources including temperature, light, springiness, roughness and length, wherein said input is provided by a topographical input device or a standard input device with modified functional attributes.

9. The data processing system of claim 8, wherein said topographical input device is a topographical selection GUI.

10. The data processing system of claim 8, wherein said standard input device includes:

a mouse, wherein said device driver of said mouse is modified to interpret mouse movement and button pushes as topographical input including height, speed of movement, frequency; and a joystick, wherein a device driver of said joystick is modified to interpret joystick movement as topographical input including pressure.

11. The data processing system of claim 5, wherein said rendering means renders a three dimensional object on to a 2D display.

12. The data processing system of claim 5, wherein said outputting means provides said output to a topographical output unit.

13. The data processing system of claim 5, wherein, said rendering means includes at least one converter having means for:

taking a topographical attribute as input;

applying said topographical attribute to an object; and controlling a plurality of output device drivers to provide said applied topographical attribute to an output of said object.

14. A data processing system comprising:

a 2D and 3D module;

a clip region for enabling interaction between said 2D and 3D modules;

topographically aware device drivers;

means for converting input/output (I/O) information from a first dimensional space to a second dimensional space, wherein 2D data may be converted to 3D data and vice versa;

means for sending calls within said framework to particular device drivers and Operating System (OS) calls;

means for providing user global setup inputs including zoom, frequency, clip region and user movement; and I/O means for sending and receiving topographical user data on a topographical render surface, wherein said topographical user data includes one or more attributes from among: three dimension (3D) representation, intensity, heat, illumination, light source, shadowing, color, height, springiness, and roughness.

15. A data processing system, comprising:

a 2D and 3D module;

a clip region for enabling interaction between said 2D and 3D modules;

topographically aware device drivers;

means for converting input/output (I/O) information from a first dimensional space to a second dimensional space, wherein, said converting means includes:

means for determining which one of a plurality of topographical converters is required to render a particular topographical attribute;

means for directing a topographical input to said converter, wherein a topographical output is rendered; and means for providing said topographical output to a particular device driver, wherein said device driver permits said topographical output to be outputted to a particular output device means for sending calls within said framework to particular device drivers and Operating System (OS) calls;

means for providing user global setup inputs including zoom, frequency, clip region and user movement; and I/O means for sending and receiving topographical user data on a topographical render surface.

16. An operating system (OS)-supported graphical user interface (GUI) comprising:

means for selecting a topographical attribute to apply to an object, wherein said attribute is selected from among three dimension (3D) representation, intensity, heat, illumination, light source, shadowing, color, height, springiness, and roughness;

means for choosing an output device, wherein said output device is chosen from among two-dimensional (2D) devices and topographical devices; and means for electing a transport mechanism for sending said object to said chosen output device.

17. The GUI of claim 16, wherein said attribute is provided with a range of values, wherein said selecting means includes means for selecting a specific value of said attribute.

18. The GUI of claim 16, wherein said selecting means includes a sliding bar on said range of values which may be selectively moved over said range by a user with an input device.

19. The GUI of claim 16, wherein said selecting means is controlled by said OS and further includes:

means for evaluating an input for its topographical characteristics;

means, responsive to said evaluating means, for dynamically selecting said attribute to apply to said object; and means, also responsive to said evaluating means, for controlling an output device driver of said data processing system to produce an output of said object with said topographical characteristics.

20. A computer program product comprising:

a computer readable medium; and program instructions on said computer readable medium for:

an operating system having means to render 2D data into 3D data to a given application layer, wherein said 2D data originates from at least one of 2D application, 3D application, 2D Operating System (OS) and 3D OS; and means for enabling output to a topographical (3D) device independently of the given application layer.

21. The computer program product of claim 20, wherein said 3D data includes topographical attributes from among three dimension (3D) representation, intensity, heat, illumination, light source, shadowing, color, height, springiness, and roughness.

22. A computer program product comprising:

a computer readable medium; and program instructions on said computer readable medium for:

an operating system having means to render 3D data into 2D data to a given application layer, wherein said 3D data originates from at least one of 2D application, 3D application, 2D Operating System (OS) and 3D OS; and means for enabling output to a topographical (2D) device independently of the given application layer.

23. The computer program product of claim 22, wherein said 3D data includes topographical attributes from among three dimension (3D) representation, intensity, heat, illumination, light source, shadowing, color, height, springiness, and roughness.

* * * * *